(12) United States Patent
Markin et al.

(10) Patent No.: US 6,389,836 B1
(45) Date of Patent: May 21, 2002

(54) ICE MILL FOR USE WITH TOY REFRESHMENT STAND

(75) Inventors: Craig Markin, Copley; Aaron Shaffer, Stow, both of OH (US)

(73) Assignee: The Little Tikes Company, Hudson, OH (US)

( * ) Notice: Subject to any disclaimer, the term of this patent is extended or adjusted under 35 U.S.C. 154(b) by 0 days.

(21) Appl. No.: 09/590,349

(22) Filed: Jun. 8, 2000

(51) Int. Cl.[7] .................................................. F25C 5/02
(52) U.S. Cl. .......................................... 62/320; 241/92
(58) Field of Search ..................... 62/320; 241/DIG. 17, 241/92

(56) References Cited

U.S. PATENT DOCUMENTS

| | | | |
|---|---|---|---|
| 138,167 A | 4/1873 | Langenbach | |
| 1,381,673 A | 6/1921 | Sherwood | |
| 1,449,917 A | * 3/1923 | Shaw et al. | 271/DIG. 17 |
| 2,071,730 A | 2/1937 | Coventry | 83/63 |
| 2,113,483 A | 4/1938 | Knight | 62/142 |
| 2,165,763 A | * 7/1939 | Prichard | 241/DIG. 17 |
| 2,539,734 A | 1/1951 | Echols, Sr. et al. | 241/90 |
| 3,100,588 A | 8/1963 | Pearson, Jr. | 222/156 |
| 3,748,437 A | 7/1973 | Keeshin et al. | 219/214 |
| 4,055,099 A | * 10/1977 | Mitsubayshi | 241/DIG. 17 |
| 4,588,136 A | 5/1986 | Homma | 241/95 |
| 5,007,591 A | * 4/1991 | Daniels, Jr. | 241/DIG. 17 |
| 5,306,192 A | 4/1994 | Caveza et al. | 446/71 |
| 5,402,949 A | * 4/1995 | Berner et al. | 241/101 |
| 5,897,038 A | 4/1999 | Myers | 222/608 |
| 6,012,660 A | * 1/2000 | Colman | 241/30 |

* cited by examiner

Primary Examiner—Harry B. Tanner
Assistant Examiner—Mohammad M Ali
(74) Attorney, Agent, or Firm—Piper Marbury Rudnick & Wolfe

(57) ABSTRACT

An apparatus for producing shavings of a solid volume of frozen beverage includes a hollow body, a blade assembly, and a drive mechanism. The hollow body defines a cavity having an axis and a substantially constant non-circular cross-section perpendicular to the axis. The body has a first end and a second end. The non-circular cross-section is configured to engage the solid volume and to prevent rotational movement of the solid volume about the axis while allowing for axial movement of the solid volume along the axis. The blade assembly is rotatably mounted in the cavity near the second end of the body. The drive mechanism is operably coupled to the blade assembly. A refreshment stand for dispensing snacks, drinks and snow cones using a solid volume of frozen beverage produced in a conventional home freezer includes a cart, an ice shaving apparatus, means for removably connecting the apparatus to the cart, and at least one mold. The mold is adapted for forming the solid volume having a non-circular cross-section that substantially corresponds to the cross-section of the chamber of the apparatus. The solid volume, when placed within the ice chamber, mutually interferes with the apparatus to prevent rotation of the solid volume about the axis. A method of forming a non-rotatable solid volume for use in an ice shaving apparatus defining a cavity having a substantially constant, non-circular cross-section. A method of enclosing an ice chamber of an ice shaving apparatus with a "child-resistant" cover.

19 Claims, 6 Drawing Sheets

ICE MILL FOR USE WITH TOY REFRESHMENT STAND

FIELD OF THE INVENTION

The present invention relates generally to the field of portable refreshment stands. More particularly, the invention relates to a snack, drink and snow cone dispensing portable cart including an ice shaving apparatus.

BACKGROUND OF THE INVENTION

Children enjoy treats including candy, chips, liquid refreshments and snow cones. Children also enjoy imitating various activities encountered in everyday life, including entertaining, making refreshments, and providing refreshments to others, such as through the archetypical lemonade stand. Refreshment stands, such as the archetypical lemonade stand, allow children to role play, and participate in entertaining and assisting others. Additionally, a refreshment stand can be a useful tool for teaching and introducing the entrepreneurial business world to children.

Refreshment stands adapted for dispensing snacks, drinks or snow cones, are known. Refreshment stands typically fall within one of two groups. The first group includes the homemade, make-shift lemonade stand typically having a table or a structure resembling a stand. The table or structure typically only functions to provide to provide a support surface for separate items used in association with the stand. These separate items can include coolers, pitchers, cash boxes, ice, snacks, drinks, etc. The separate items are typically transported separately from and placed on or near the homemade stand. The second group includes portable, professional refreshment stands typically operated by adults. These stands are typically large, metallic structures having multiple storage containers and electrically operated components.

Ice mills typically used in association with refreshment stands are large complex devices having ice chipping blade assemblies which are typically configured for operation solely by adults. Ice mills typically include an electric motor adapted to drive the chipping assembly or a large manually operated crank mechanism connected to the chipping assembly which requires the strength of a typical adult to operate.

Existing refreshment stands, however, have a number of drawbacks. The typical "homemade" refreshment stand requires assembly, and transporting, and placement of additional separate items, such as snacks, etc. The often haphazard placement and use of the additional separate items is typically inefficient, space consuming and susceptible to knocking, spilling and breaking. Further, the typical "homemade" refreshment stand is not configured to conveniently accommodate, store and dispense snacks, drinks and snow cones. The professional type refreshment stand, although multi-functional and capable of accommodating and dispensing snacks, drinks and snow cones, is typically large, heavy and expensive. The professional type refreshment stands are typically too hazardous to be used by children. Additionally, the professional type refreshment stand can require an expensive internal or external power source.

Refreshment stands typically do not include ice mills. Those refreshment stands that do include ice mills, typically include expensive, complex, electrically operated ice mills. The ice mills are typically unsafe and not configured for operation by children.

Adult-operated refreshment stands, as seen in baseball parks, county fairs and the like, often have the capability to vend frozen items such as snow cones. These refreshment stands typically have refrigeration or freezer units to maintain the refreshments in a frozen condition, and will have electrical power cords or mobile generators to run the coolant compressors. These adult features cannot be cheaply or safely reproduced in a child's role-playing toy. But it nevertheless would be highly desirable to provide a child's refreshment stand capable of vending a frozen or icy beverage.

Thus, there is a continuing need for a refreshment stand capable of dispensing snacks, drinks and snow cones that is portable and safe for the use by children. It would be advantageous to provide a lightweight, durable, and easy to operate refreshment stand for children's entertainment and enjoyment. What is needed is an ice mill for a refreshment stand that can be safely and easily operated by children, without requiring electric power. It would be advantageous to provide an ice mill for a refreshment stand that is configured to prevent children from accessing the ice chipping blades of the ice mill. It further would be advantageous to provide a method for easily producing a non-rotatable block of ice specifically suited for use in the ice mill.

SUMMARY OF THE INVENTION

According to a principal aspect of the invention, an apparatus for producing shavings of a solid volume of frozen beverage includes a hollow body, a blade assembly, and a drive mechanism. The hollow body defines a cavity having an axis and a substantially constant non-circular cross-section perpendicular to the axis. The body has a first end and a second end. The non-circular cross-section is configured to engage the solid volume of frozen beverage and to prevent rotational movement of the solid volume of frozen beverage about the axis while allowing for axial movement of the solid volume of frozen beverage along the axis. The blade assembly is rotatably mounted in the cavity near the second end of the body. The drive mechanism is operably coupled to the blade assembly.

According to another aspect of the invention, an ice mill for shaving a non-rotatable solid volume of frozen beverage or other frozen beverage includes a generally tubular body, a generally circular bottom plate, at least one blade, a drive mechanism, and a cover. The generally tubular body has an upper end and a lower end. The generally circular bottom plate is rotatably coupled to the lower end of the body. The bottom plate has at least one opening. The blade is connected to and generally upwardly extends from the bottom plate. The blade is positioned adjacent to the opening. The drive mechanism is coupled to the bottom plate. The cover is removably connected to the upper end. The cover includes an inwardly and downwardly extending biasing member configured to exert continuous pressure on the solid volume of frozen beverage.

According to another aspect of the invention, an ice shaving apparatus for shaving a non-rotatable solid volume of frozen beverage or other frozen beverage includes a hollow body, a generally circular bottom plate, at least one blade, a first gear, a second gear, and a drive mechanism. The hollow body has an upper end and a lower end, and inner and outer walls. The generally circular bottom plate is coupled to the lower end of the body. The bottom plate having at least one opening. The blade is connected to and generally upwardly extends from the bottom plate. The blade is positioned adjacent to the opening. The first gear is connected to an edge of the bottom plate. The second gear is disposed between the inner and outer walls and engaged with the first gear. The drive mechanism is coupled to the second gear.

According to another aspect of the invention, an ice shaving system for shaving a solid volume of frozen beverage includes an ice mill, a blade assembly, and a means for biasing the solid volume of frozen beverage against the blade assembly. The ice mill includes a body having a first end and a second end. The body defines a cavity having a substantially constant, non-circular cross-section extending between the first and second ends of the body. The blade assembly is rotatably mounted in the cavity near the second end of the body.

According to another aspect of the invention, a refreshment stand for dispensing snacks, drinks and snow cones using a solid volume of frozen beverage produced in a conventional home freezer includes a cart, an ice shaving apparatus, means for removably connecting the apparatus to the cart, and at least one mold. The ice shaving apparatus has an axis and an ice chamber. The ice chamber further includes a substantially constant non-circular cross-section perpendicular to the axis. The mold is adapted for forming the solid volume of frozen beverage having a non-circular cross-section that substantially corresponds to the cross-section of the chamber of the apparatus. The solid volume of frozen beverage, when placed within the ice chamber, mutually interferes with the apparatus to prevent rotation of the solid volume about the axis.

The present invention also provides a method of forming a non-rotatable solid volume of frozen beverage for use in an ice shaving apparatus defining a cavity having a substantially constant, non-circular cross-section. The method includes placing a beverage into a mold having a substantially constant, non-circular cross-section which substantially corresponds to the non-circular cross-section of the cavity. The method further provides transferring the mold and the beverage into a freezing unit, removing the mold and the beverage from the freezing unit when the beverage has solidified, removing the solid volume of frozen beverage having a non-circular cross-section from the mold, and slidably inserting the solid volume of frozen beverage into the ice shaving apparatus by aligning the non-circular cross-section of the solid volume of frozen beverage with non-circular cross-section of the cavity.

The present invention also provides a method of enclosing an ice chamber of an ice shaving apparatus with a "child-resistant" cover. The method includes positioning the cover over the chamber at an end of a body of the ice shaving apparatus, aligning at least one projection extending from one of the end of the body and the cover with at least one channel having a receiving section and an engaging section defined into the other of the end and the cover, inserting the at least one projection into the receiving section of the at least one channel against a biasing force predetermined to be too large to be overcome by a child, and rotating the cover relative to the body to position the at least one projection within the engaging section of the at least one channel. In this way, a parent or other child supervisor can use a conventional freezer to create a frozen block of beverage, install the block of beverage into the ice mill, close the ice mill with a substantially child-resistant cover, and permit the child to use the ice mill on a toy concession cart. The ability to vend a frozen substance from the concession cart greatly enhances play.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF THE PREFERRED EMBODIMENTS

Figure 1:
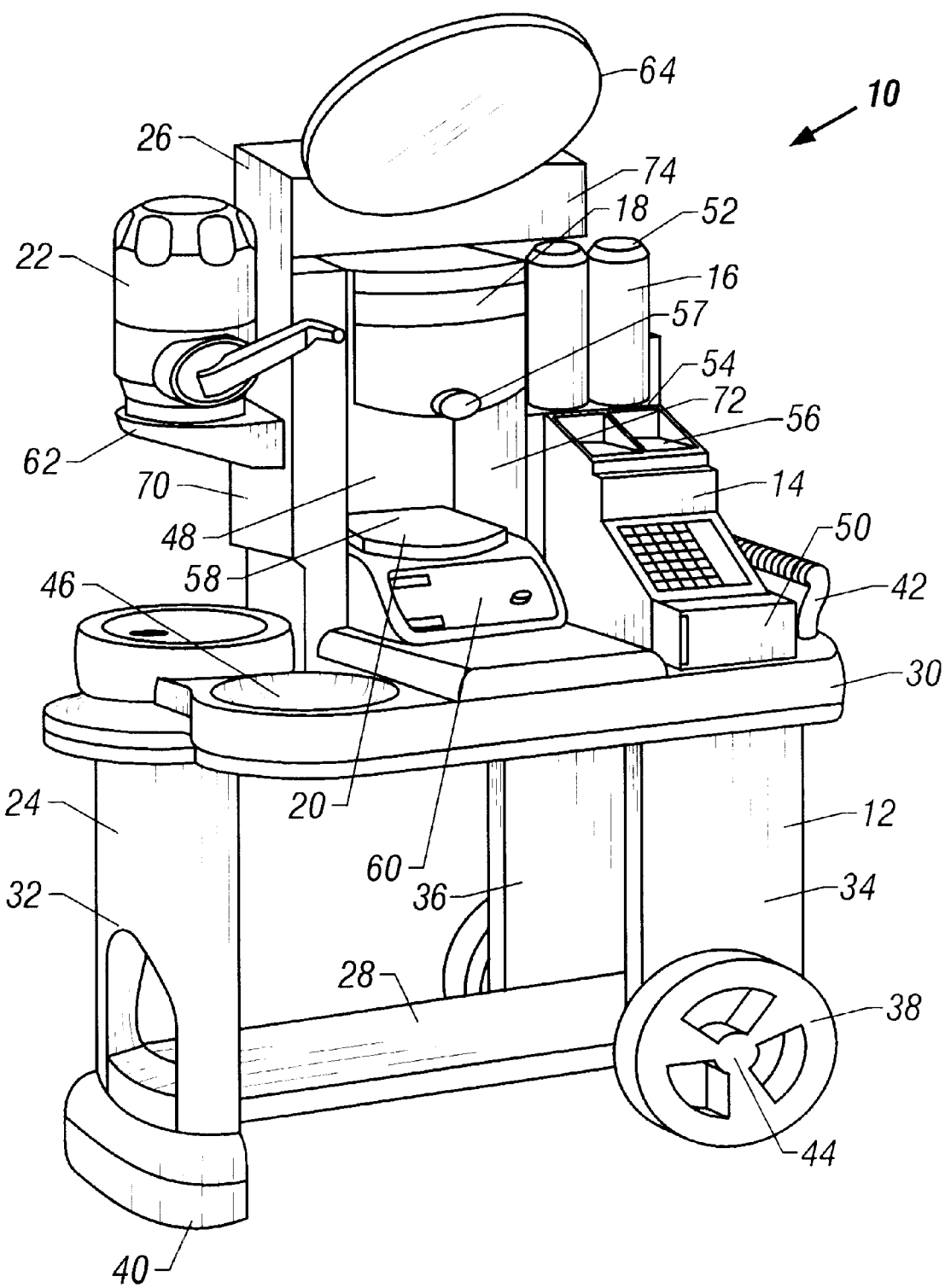
FIG. 1 is a side perspective view of a toy refreshment stand employing the present invention.

Referring first to FIG. 1, a refreshment cart 10, also referred to as a refreshment stand, according to an exemplary embodiment of the present invention generally includes a frame 12, a toy cash register 14, candy dispensers 16, a drink dispenser 18, a drink platform 20, and an ice mill 22. Frame 12 is a structure comprised of several generally horizontal and vertical members. In an exemplary embodiment, each of the generally horizontal and vertical members can be joined as by fasteners or adhesives. In an alternative exemplary embodiment, each member of frame 12 is configured to be connected to form frame 12. Frame 12 is configured to hold and support register 14, dispensers 16, 18, platform 20 and ice mill 22. Frame 12 is preferably made of molded plastic. Alternatively frame 12 can be made of other materials such as aluminum, wood, fiberglass, etc. Frame 12 provides a lightweight durable support structure for the components of refreshment cart 10. Frame 12 includes a lower portion 24 and an upper portion 26. Lower portion 24 of frame 12 includes two generally horizontally positioned members, lower member 28 and countertop 30. Lower horizontal member 28 and countertop 30 are spaced apart and supported by generally vertical members, forward vertical member 32 and rear vertical members 34, 36.

Countertop 30 is a generally horizontal member connected to vertical members 34, 36 of lower frame 12. Countertop includes bowl shaped recesses 46 configured to receive snacks or supplies. Countertop 30 is configured to provide a main support structure for upper frame 26, register 14, drink platform 20 and additional components and supplies of refreshment cart 10.

Lower frame 12 further includes a pair of wheels 38, a footing 40 and a handle 42. Wheels 38 are rotatably connected to the rearward side of lower frame 12 at the junction of lower horizontal member 28 and vertical members 34, 36 of lower portion 24 of frame 12. Wheels 38 allow for refreshment cart 10 to be easily transported from one location to another. Wheels 38 are made of molded plastic. Alternatively, wheels 38 can be made of other materials such as rubber, wood, metal, etc. In an exemplary embodiment, wheels 38 are connected by an axle (not shown) extending through lower portion 24 of frame 12.

Footing 40 downwardly and integrally extends from a forward end of lower frame 12 at the junction of lower horizontal member 28 and forward vertical member 32. Footing 40 is a support structure transversely extending across a longitudinal axis of cart 10 at the front lower end of refreshment cart 10. In an exemplary embodiment, footing 40 is integrally connected to lower portion 24 of frame 12. Footing 40 can also be connected to frame 12 by alternative means such as, fasteners, adhesives, etc. Footing 40 provides a lightweight support for refreshment cart 10 that enables refreshment cart 10 to maintain an upright position and prevents refreshment cart 10 from inadvertently sliding.

Handle 42 is a tubular structure upwardly and rearwardly extending at each end from countertop 30. Handle 42 provides a location for grasping of cart 10 by the user. Handle 42 enables a user to pivot cart 10 about an axis 44 of wheels 38 by applying a downward force to handle 42 such that footing 40 is lifted from the ground thereby allowing cart 10 to be repositioned or transported from one location to another. Handle 42 is made of plastic. Alternatively, handle 42 can be made of other materials such as aluminum, wood, etc. In an alternative exemplary embodiment, handle 42 consists of two separate mandrels outwardly extending from frame 12.

Upper portion 26 of frame 12 is an upright structure upwardly extending from countertop 30. In an exemplary embodiment, upper portion 26 is integrally connected to lower portion 24 of frame 12. Alternatively, upper portion 26 can be connected to lower portion 24 of frame 12 by other means such as snap fit engagement, fasteners, adhesives, etc. Upper portion 26 provides additional support structure for cart 10 to support additional components of cart 10. Upper portion 26 includes a pair of vertical members 70, 72 upwardly extending from countertop 30 and spaced apart by and connected to horizontal member 74. Vertical members 70, 72 and horizontal member 74 define an opening 48 sized to accommodate drink dispenser 18 and a portion of drink platform 20.

Upper portion 26 of frame 12 further includes an ice mill support 62 and a sign 64. Ice mill support 62 is one means for removably connecting ice mill 22 to cart 10. Ice mill support 62 is a generally planar structure outwardly and forwardly extending from vertical member 70 of upper portion 26 of frame 12. Ice mill support 62 is removably connected to upper portion 26. Alternatively, ice mill support 62 can be integrally or removably connected to any vertical member of frame 12. Ice mill support 62 is configured to support and suspend ice mill 22 above countertop 30 of frame 12. Ice mill support 62 is made out of molded plastic. Alternatively, ice mill support 62 can be made of other materials such as wood, etc. Alternative configurations for ice mill support 62 are contemplated such as a hook, a matably engaging member, releasable fasteners, etc.

Cart 10 further has a sign 64 which is a generally flat sheet. Sign 64 is removably connected to upper portion 26. Sign 64 provides a surface area for displaying alpha-numeric or other graphical indication of source of vendor, such as Little Tikes, Inc., or other information or graphics. Sign 64 is made of plastic. Alternatively, sign 64 can be made of other materials such as wood, etc.

Toy cash register 14 is a device connected to countertop 30 of frame 12. In an exemplary embodiment, cash register 14 is integrally connected to frame 12. Alternatively, register 14 can be connected to countertop 30 by other means such as snap fit engagement, fasteners, adhesives, etc. Cash register 14 is configured to replicate a conventional cash register and includes a functional cash drawer 50 for holding coins and bills. Cash drawer 50 is positionable between a first position, in which cash drawer 50 outwardly extends from register 14 thereby allowing the user to deposit coins and dollar bills into cash drawer 50, and a second position, in which the cash drawer 50 is enclosed within register 14 in a closed position. Cash register 14 is made of plastic. Alternatively, cash register 14 can be made of alternative materials such as metal. Cash register 14 provides a convenient location for storing real or toy and coins and bills. Cash register 14 replicates a conventional cash register to assist a user, such as a child, in role playing. In alternative exemplary embodiments, cash register 14 can include push buttons representative of numbers and a release mechanism, such as a button, for opening drawer 50. In an alternative exemplary embodiment, cash register 14 can be a conventional cash register.

Candy dispensers 16 are a pair of two hollow tubes vertically positioned adjacent to one another and connected to upper portion 26 of frame 12. In an exemplary embodiment, candy dispensers 16 are removably connected to frame 12 to allow for easy filling and cleaning of candy dispensers 16. Candy dispensers 16 are configured to hold, store, display and dispense food stuffs, such as candy, nuts, chips. Candy dispensers 16 are made of a transparent plastic material. Alternatively, candy dispensers 16 can be made of colored, tinted, or semi-transparent materials such as glass. Candy dispensers 16 provide an ergonomically positioned dispenser for dispensing candy or other food stuffs. The transparent material of candy dispenser 16 provides a colorful and attractive appearance for users of refreshment cart 10. Each candy dispenser 16 includes a cap 52 positioned at an upper end of candy dispenser 16. In an exemplary embodiment, each candy dispenser 16 also includes dispensing means 54 located at a lower end of candy dispenser 16. Dispensing means 54 can include a valve, such as a gate, ball, or check valve, a slidable door, a resilient restricted opening, or a push to release mechanism.

A candy dispenser platform 56 is positioned at the top of cash register 14 directly below candy dispensers 16. Candy dispenser platform 56 is configured to hold a container for the collection of candy or other food stuffs dispensed from candy dispensers 16. In an exemplary embodiment, candy dispensers 16 are removably connected to frame 12 to allow for easy filling and cleaning of candy dispensers 16.

Drink dispenser 18 is a container configured to fit with an upper section of opening 48 within upper portion 26 of frame 12. Drink dispenser 18 includes opposing forward and rearward sides that connect to upper portion 26 of frame 12. In an exemplary embodiment, drink dispenser 18 is removably connected to upper portion 26 of frame 12 for easy cleaning and filling of drink dispenser 18. Drink dispenser 18 is configured to receive, retain, display and dispense beverages on demand. Drink dispenser 18 is made of a transparent plastic. Alternatively, drink dispenser 18 can be made of tinted or non-transparent plastic, metal, glass, etc. Drink dispenser 18 is suspended above drink platform 20 of frame 12 such that a user can easily position a cup or container below drink dispenser 18 to receive the beverage contained within drink dispenser 18. The transparent material of drink dispenser 18 enables the user to determine the amount and type of beverage contained within drink dispenser 18. Drink dispenser 18 includes a dispenser actuator 57 positioned at the lower front surface of drink dispenser 18. Dispenser actuator 57 is configured to allow the beverage to exit drink dispenser 18 upon actuation by the user. Drink dispenser further includes a removable lid (not shown) or cap (not shown) for re-filling drink dispenser 18 with a beverage.

Drink platform 20 is a generally rectangular structure having a flat upper surface 58 and a sloped forward surface 60. Drink platform 20 is positioned on countertop 30 between or within opening 48 of upper portion 26 of frame 12. In an exemplary embodiment, drink platform 20 is integrally connected to frame 12. Alternatively, drink dispenser 18 can be connected through fasteners or snap fit to frame 12. Drink platform 20 provides a raised generally horizontal upper surface 58 for resting a cup or container for receiving liquid dispensed from drink dispenser 18. Additionally, drink platform 20 is configured to look like a scale and can include alpha-numeric and/or graphical indicia on the front surface 60 of drink platform 20.

Figure 2:
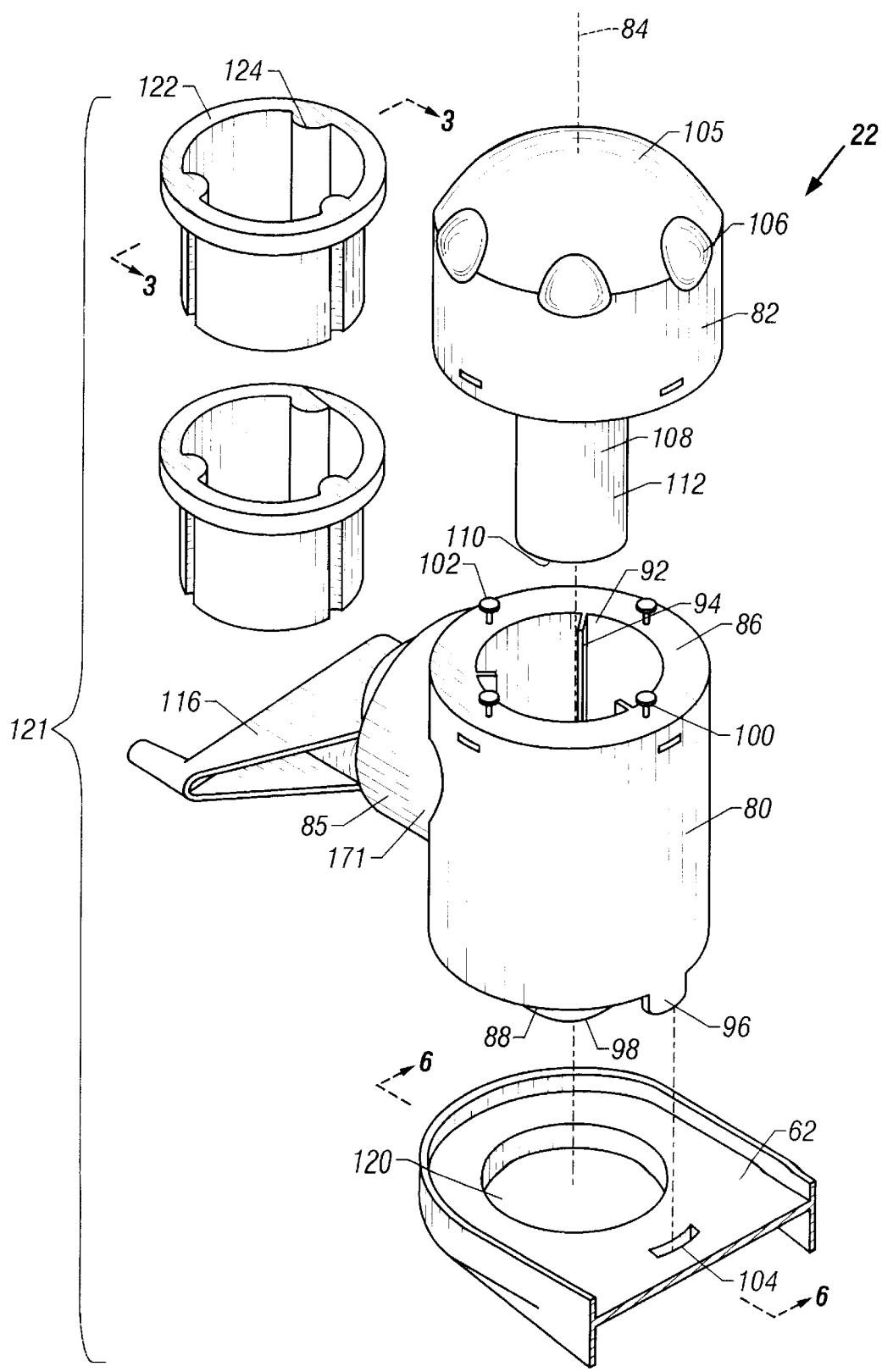
FIG. 2 is an exploded isometric view of an ice mill in accordance with an exemplary embodiment of the present invention.

Ice mill 22, also referred to as an ice shaving apparatus, is shown in greater detail in FIGS. 2 and 5 through 9. FIG. 2 is an exploded perspective view of ice mill system 121 including ice mill 22, ice mill support 62, and cylindrical mold 122. Ice mill 22 includes a generally tubular body 80, a cover 82 and a drive mechanism 85. Tubular body 80 is a hollow generally cylindrical structure extending along a longtudinal axis 84. Body 80 has a first end 86 and a second end 88. Body 80 is slidably and removably connected to ice mill support 62 at lower end 88 of body 80. Body 80 is configured to receive and retain a solid volume of frozen beverage 90, shown on FIGS. 3 through 5, or a similar block of any frozen beverage. Body 80 is generally made of plastic. Alternatively, body 80 can be made of other materials, such as aluminum, etc. Body 80 defines an elongate generally cylindrical or prismatic ice chamber 92.

According to the invention, the inner cavity or chamber 92 has a substantially constant cross-section perpendicular to axis 84 throughout its axial length, so that a conforming solid volume of frozen beverage 90 can slide down from first end 86 toward second end 88 as solid volume 90 gets consumed. But the orthogonal cross-section of chamber 92 is in some way noncircular, so as to prevent isolation of the frozen beverage block 90 about the axis 84. This can be done by making the chamber 92 oval or polyhedral in cross-section, or by giving it any irregular shape. In the illustrated embodiment, the necessary noncircularity is accomplished by forming at least one, and preferably three inwardly and longitudinally extending fins 94 on the interior sidewall of chamber 92. Fins 94 are integrally formed to body 80. Fins 94 are configured to engage grooves 102 formed into volume of frozen beverage 90 (see FIG. 5) thereby preventing volume of frozen beverage 90 from rotating about longtudinal axis 84 while enabling volume of frozen beverage 90 to move axially through chamber 92 of body 80. Fins 94 are made of plastic. In an exemplary embodiment, body 80 includes three fins 94 spaced approximately 120 degrees apart from one another within chamber 92 of body 80. In alternative exemplary embodiments, body 80 can include one or more fins 94.

Tongue 96 is an arcuate projection outwardly and downwardly extending from lower end 88 of body 80. Tongue 96 slidably and removably engages a groove 104 defined within ice mill support 62. Tongue 96 secures ice mill 22 to ice mill support 62 and frame 12 of cart 10 and prevents ice mill 22 from rotating relative to ice mill support 62. Tongue 96 enables ice mill 22 to be easily and quickly installed to ice mill support 62 or removed from ice mill support 62 for refilling, cleaning or storage.

Four fasteners 100 are connected into four holes defined within upper end 86 of body 80. Fasteners 100 are threadedly engaged to upper end 86 at the holes. Alternatively, fasteners 100 can be secured by other means such as cementing, press fit, etc. Each of the four fasteners 100 includes a head 102 which, when installed, upwardly extends from upper end 86. In an exemplary embodiment, fasteners 100 are made of metal. Alternatively, fasteners 100 can be made of other materials, such as plastic, etc. Fasteners 100 enable cover 82 to be releasably connected to body through a bayonet-type connection. Alternative connection methods can also be used such as snap fit engagement, etc.

Drive mechanism extension 171 is a generally circular cover outwardly extending from the side of body 80. Extension 171 is integrally formed to sidewall. Extension 171 provides a support for drive mechanism 85.

Cover 82 is a "mushroom" shaped structure. Cover 82 removably engages upper end 86 of body 80. Cover 82 is configured to enclose upper end 86 of body 80 and to retain solid volume of frozen beverage 90 securely within chamber 92. Cover 82 is generally made of plastic. Alternatively, cover 82 can be made of other materials, such as aluminum, etc. Cover 82 includes a domed upper surface 104 that includes a plurality of indentations 106. Indentations 106 within cover 82 are configured to facilitate grasping of cover 82 by the user for insertion and removal onto and off of body 80. In an exemplary embodiment, cover 82 is sufficiently sized to reduce the likelihood of a small child opening cover 82 and accessing chamber 92 within body 80. In an exemplary embodiment, cover 82 has an outside diameter of approximately 4 inches. The size of cover 82 and the bayonet-type removable connection of cover 82 to body 80 are "child-resistant" design features which enable an adult user to open cover 82 and access chamber 92 while reducing the likelihood of small children removing cover 82. Alternatively, alternative connection methods can also be used such as snap fit engagement, etc.

Figure 6:
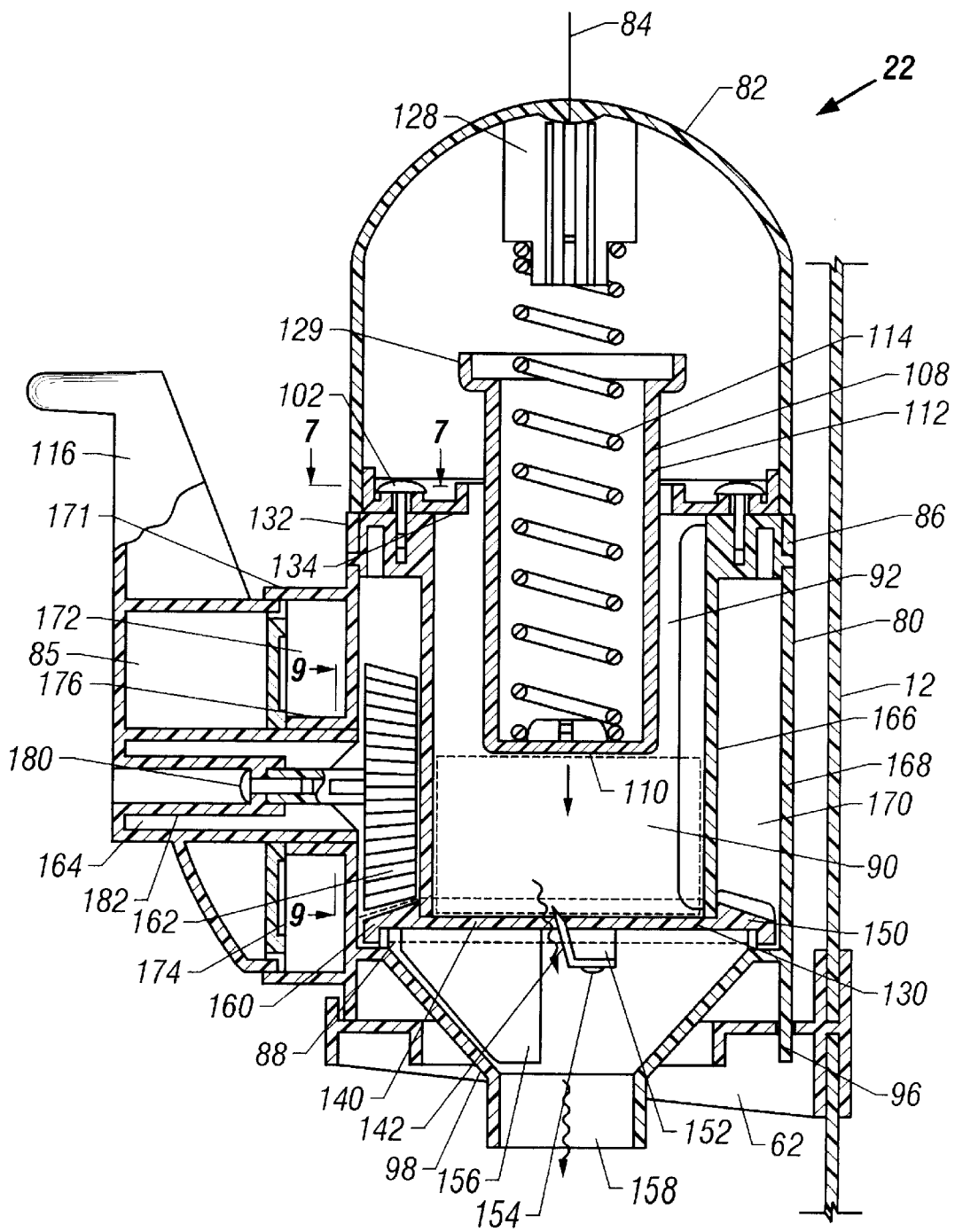
FIG. 6 is a longitudinal sectional view of the ice mill taken substantially along line 6—6 of FIG. 2.

Cover 82 further includes a housing 108. Housing 108 is a cup-like structure having a contact surface 110 and cylindrical side surface 112 configured to substantially enclose a biasing member 114, shown in FIG. 6. Referring to FIGS. 2 and 6, housing 108 is connected to biasing member 114 and cover 82. Housing 108 is configured to contact solid volume of frozen beverage 90 and retain volume of frozen beverage 90 securely within chamber 92 of body 80. Housing 108 is made of plastic. Alternatively, housing 108 can be made out of other materials, such as aluminum, stainless steel, etc. Housing 108 is sized to extend longitudinally into chamber 92 of body 80 in order to maintain contact with solid volume of frozen beverage 90, as the ice is converted into shavings by ice mill 22. Contact surface 110 is also known as an ice-engaging plate or a lower surface. In an alternative exemplary embodiment, ice mill 22 may be configured without cover and the force of gravity can be used to maintain contact between solid volume of frozen beverage 90 and blade assembly 130.

Drive mechanism 85 is rotatably connected to drive mechanism extension 171 of body 80. In an exemplary embodiment, drive mechanism 85 includes a hand crank 116. Hand crank 116 is configured to enable a user to manually operate ice mill 22. Hand crank 116 is made out of plastic. Alternatively, hand crank can be made out of other materials, such as metal, etc.

Ice mill support 62 includes a circular opening 120 and groove 104. Circular opening 120 is sized to removably receive a funnel 98 connected to lower end 88 of body 80. Circular opening 120 and groove 104 enable ice mill support 62 to securely retain ice mill 22 on frame 12 of cart 10.

Figure 3:
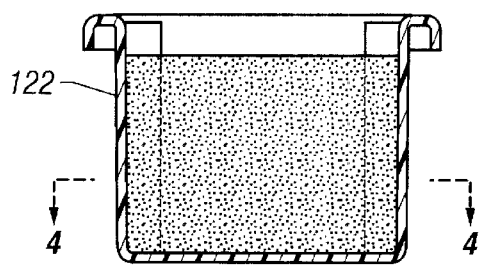
FIG. 3 is a longitudinal cross-sectional view of a frozen beverage mold taken substantially along line 3—3 of FIG. 2.
Figure 4:
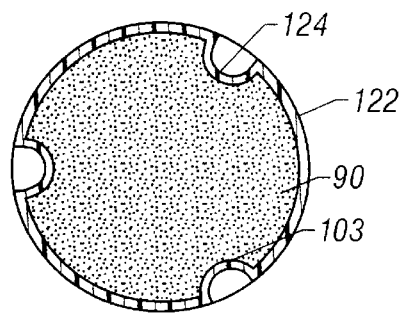
FIG. 4 is a transverse cross-sectional view of the cylindrical mold taken substantially along line 4—4 of FIG. 3.

As shown in FIGS. 2 through 4, the ice mill 22, is part of a frozen beverage dispensing system 121 which further includes mold 122. Mold 122 is a structure having a substantially constant, noncircular cross-section that substantially corresponds to the cross-section of chamber 92. In an exemplary embodiment, mold 122 is a cup-like structure including three longitudinally and inwardly extending ribs 124. Mold 122 is configured to receive a beverage and retain the beverage as it is placed into a freezer, where the beverage undergoes a phase change to produce solid volume of frozen beverage 90. The cylindrical shape of mold 122 and inwardly extending ribs 124 produce a volume of frozen beverage 90 that includes three longitudinally extending slots 103. Volume of frozen beverage 90 is sized to slidably insert within chamber 92 of body 80 in a manner that allows fins 94 to engage or mutually interfere with volume of frozen beverage 90 at slots 103 thereby preventing volume of frozen beverage 90 from rotating about longitudinal axis 84 during operation of ice mill 22 while allowing for volume of frozen beverage 90 to move axially along longitudinal axis 84 within body 80 of ice mill 22. When initially inserted, volume of frozen beverage 90 is sized to substantially fill chamber 92. In an exemplary embodiment, mold 122 includes three ribs 124. Alternatively, mold 122 can contain at least one rib 124. Mold 122 is made out of plastic. Alternatively, mold 122 can be made of other materials, such as metal, etc. Mold 122 allows the user to conveniently replace and refill ice mill 22 with a solid volume of frozen beverage without having to remove ice mill 22 from frame 12 or place ice mill 22 within a freezer in order to freeze the beverage into a volume of frozen beverage or a solid volume of frozen beverage. In an exemplary embodiment, ice mill 22 will be equipped with more than one mold 122 to enable the user to quickly refill ice mill 22. Alternatively, mold 122 can have any non-circular cross-section which substantially corresponds to the cross-section of chamber 92.

FIG. 6 illustrates ice mill 22 in greater detail. As shown in FIG. 6, cover 82 includes housing 108, biasing member 114 and connector 128. Housing 108 preferably substantially encloses biasing member 114. Housing 108 is configured to extend and retract from cover 82 into chamber 92 of body 80 such that contact surface 110 maintains contact and continuous downward pressure on volume of frozen beverage 90 thereby causing solid volume of frozen beverage 90 to bear against a blade assembly 130 at lower end 88 of body 80. Housing 108 includes an upper rim 129 which serves to limit the outward and downward extension of housing 108 from cover 82. When cover 82 is installed on ice mill 22, contact surface 110 bears against solid volume of frozen beverage 90 to produce a force acting between cover 82 and solid volume 90.

In an exemplary embodiment, as shown in FIG. 6, biasing member 114 is a helical spring. Biasing member 114 is connected at a second end to contact surface 110 of housing 108 and at a first end to connector 128 of cover 82. Biasing member 114 is configured to produce a continuous, preferably downward force onto housing 108 thereby causing housing 108 to extend from cover 82 in a direction parallel to longitudinal axis 84 toward second end 88 of ice mill when cover 82 is installed onto body 80. Biasing member 114 allows housing to maintain constant contact and continuous pressure on volume of frozen beverage 90 as volume of frozen beverage 90 is shaved by blade assembly 130. In an alternative exemplary embodiment, a means for biasing solid volume of frozen beverage 90 against blade assembly 130 is a spring loaded pusher.

Connector 128 is a support integrally connected to inner surface of upper domed surface of cover 82. Connector 128 provides a secure mounting structure for the connection of the upper end of biasing member 114 to connector 128.

Figure 7:
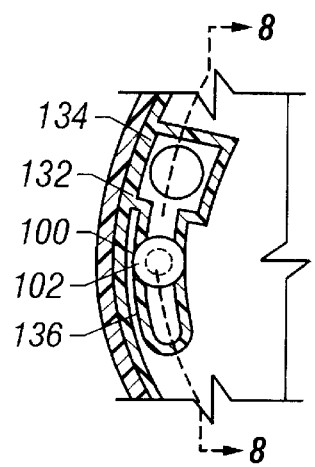
FIG. 7 is a fragmentary top sectional detail view of the ice mill taken substantially along line 7—7 of FIG. 6.
Figure 8:
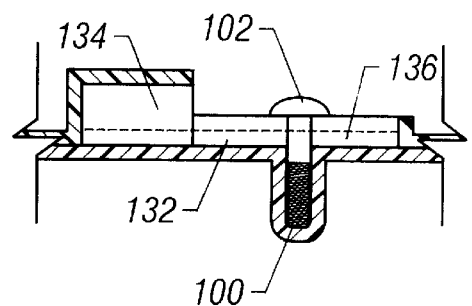
FIG. 8 is a side sectional view taken substantially along line 8—8 of FIG. 7.

Four channels 132 are defined into a lower surface 134 of cover 82. Channels 132 are illustrated in greater detail in FIGS. 7 and 8. As shown in FIG. 7, each channel includes a rectangular portion 134 connected to a slot portion 136. Rectangular portion is configured to receive the head 102 of fastener 100, and slot portion 136 of channel 132 is configured to receive the neck of fastener 100, as cover 82 is rotated by the user thereby securing cover 82 to body 80 in a bayonet-type connection. Channels 132 and fasteners 100 form a bayonet-type connection between body 80 and cover 82. The bayonet-type connection of cover 82 to body 80 allows for cover to be repeatedly attached and removed from body 80 for refilling or replacing volume of frozen beverage 90 within chamber 92 of body 80. In an exemplary embodiment, ice mill 22 includes four channels 132 within cover 82 and four fasteners 100 extending from body 80. Alternatively, a fewer number of channels and fasteners 100 can be used. In an alternative exemplary embodiment, cover 82 includes the fasteners and first end 86 of body 80 includes channels 132. Alternative fastening methods can also be used for connecting cover 82 to body 80, including snap fit connections, quick release connectors, etc.

Figure 5:
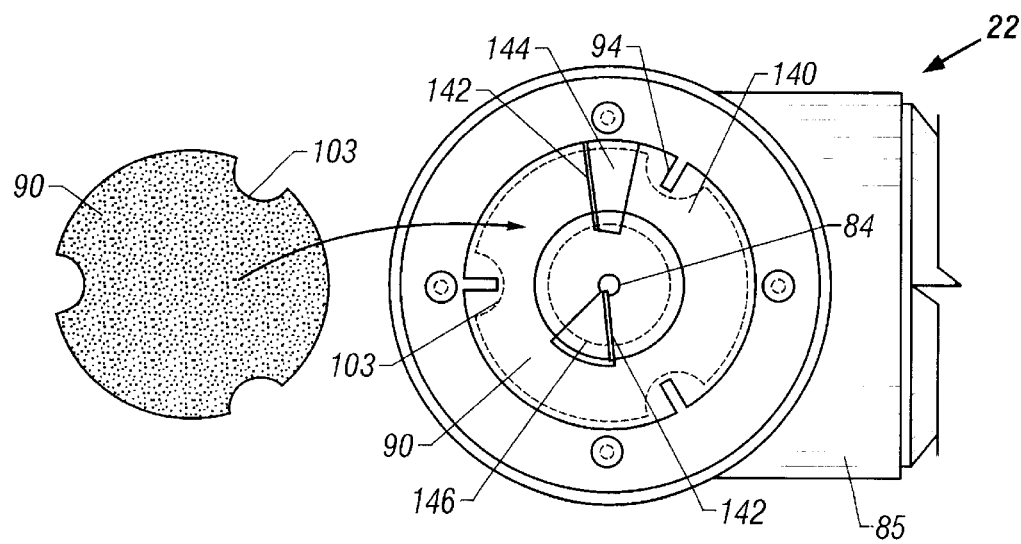
FIG. 5 is a top sectional view of a volume of frozen beverage and a cylindrical body of the ice mill of FIG. 2.

Referring to FIGS. 5 and 6, ice mill 22 further includes blade assembly 130. Blade assembly 130 includes a generally circular lower plate 140 and a pair of blades 142. Lower plate 140 is a circular disk having two openings 144, 146, and including a pair of supports 152 and a divider plate 156. Plate 140 is positioned within lower end 88 of body 80 such that lower plate 140 substantially encloses the lower end of chamber 92. Lower plate 140 is rotatable mounted at the lower end of chamber 92 about axis 84 of body 80. Lower plate 140 provides a lower surface for defining chamber 92, a surface upon which volume of frozen beverage 90 rests and bears against during operation, and a mounting surface for blades 142. Plate 140 is made out of plastic. Opening 144 of plate 140 is positioned near outer edge 150 of circular plate 140 and opening 146 is positioned near longitudinal axis 84. Openings 146 are sized to allow blades 142 to inwardly extend through opening and provide a passageway for shaved ice to pass through from chamber 92 into funnel 98 of body 80.

Supports 152 downwardly extend from plate 140 and are configured to support blades 142. Divider plate 156 is a vertically and longitudinally extending sheet downwardly extending from circular plate 140 into funnel 98. Divider plate 156 is integrally connected to a lower surface of circular plate 140. Divider plate 156 functions to dislodge accumulated shaved ice within funnel 98 of ice mill 22 and direct shaved ice toward outlet 158 of funnel 98. Divider plate 156 is made out of plastic.

Blades 142 are razor-type blades of conventional design. Blades upwardly extend into chamber 92 of body from lower plate 140. Blades 142 are positioned and are configured to shave off a portion of solid volume of frozen beverage 90 during operation of ice mill 22. Blades 142 are made of steel. Other conventional materials may also be used. Blades 142 are connected to circular plate at support 152 on circular plate 140 by fasteners 154. In an exemplary embodiment, each blade includes two fasteners 154 and fasteners 154 are convention screws. Alternatively, blades 142 may be connected to circular plate by other means, such as press fit, adhesives, etc.

FIG. 6 illustrates lower end 88 of body 80 in greater detail. Lower end 88 includes funnel 98. Funnel 98 is a conical structure integrally connected to lower end 88 of body 80. Funnel 98 is configured to receive and direct shaved ice traveling from openings 144, 146 through funnel 98 out an outlet 158 of funnel 98. Funnel 98 is made out of plastic. Funnel 98 enables shaved ice to be easily captured by a container for making snow cones and the like.

Driver mechanism 85 includes a first bevel gear 160, a second bevel gear 162, a shaft 164 and hand crank 116. First bevel gear 160 is bevel gear of conventional design integrally connected to outer edge 150 of circular plate 140 and disposed between inner and outer walls 166, 168 of body 80. An outer cavity 170 is defined by the space between inner and outer walls 166, 168. First bevel gear 160 is configured to matably engage a second bevel gear 162. First bevel gear 160 provides the mechanism by which circular plate 140 rotates. The double-wall construction of body 80 including outer cavity 170 reduces heat transfer through inner and outer walls 166, 168 thereby increasing the insulating properties of body 80.

Second bevel gear 162 is a beveled gear of conventional design. Second bevel gear 162 is generally vertically positioned within outer cavity 170 of body 80. Second bevel gear 162 matably engages first bevel gear 160 and is integrally connected to shaft 164. Second bevel gear 162 is made out of plastic. Alternatively, second bevel gear 162 can be made out of other materials, such as metal, etc. The location of the gear teeth of first bevel gear 160 and second bevel gear 162 within outer cavity 170 between inner and outer walls 166, 168 enables the gear teeth of first bevel gear 160 and second bevel gear 162 to: (1) be maintained in an enclosed environment free of moisture and debris, and (2) be separated from the frozen beverage disposed within chamber 92 and funnel 98.

Shaft 164 is an elongate bar connected a first end to second bevel gear 162 and at a second end to hand crank 116. Shaft 164 is connected to second bevel gear 160 via a fastener 180. Fastener 180 extends through a passage 182 within shaft 164. Fastener secures shaft 164 to second bevel gear 162. In an exemplary embodiment, shaft 164 is integrally formed to hand crank 116. Alternatively, shaft 164 can be removably connected to hand crank 116.

Hand crank 116 is a lever integrally connected to shaft 164 alternatively hand crank can be removably connected to shaft 164. Hand crank provides a mechanism by which a user can manually operate ice mill 22. Hand crank is made out of plastic. Alternatively hand crank 116 can be made out of other materials such as wood, metal, etc.

Figure 10:
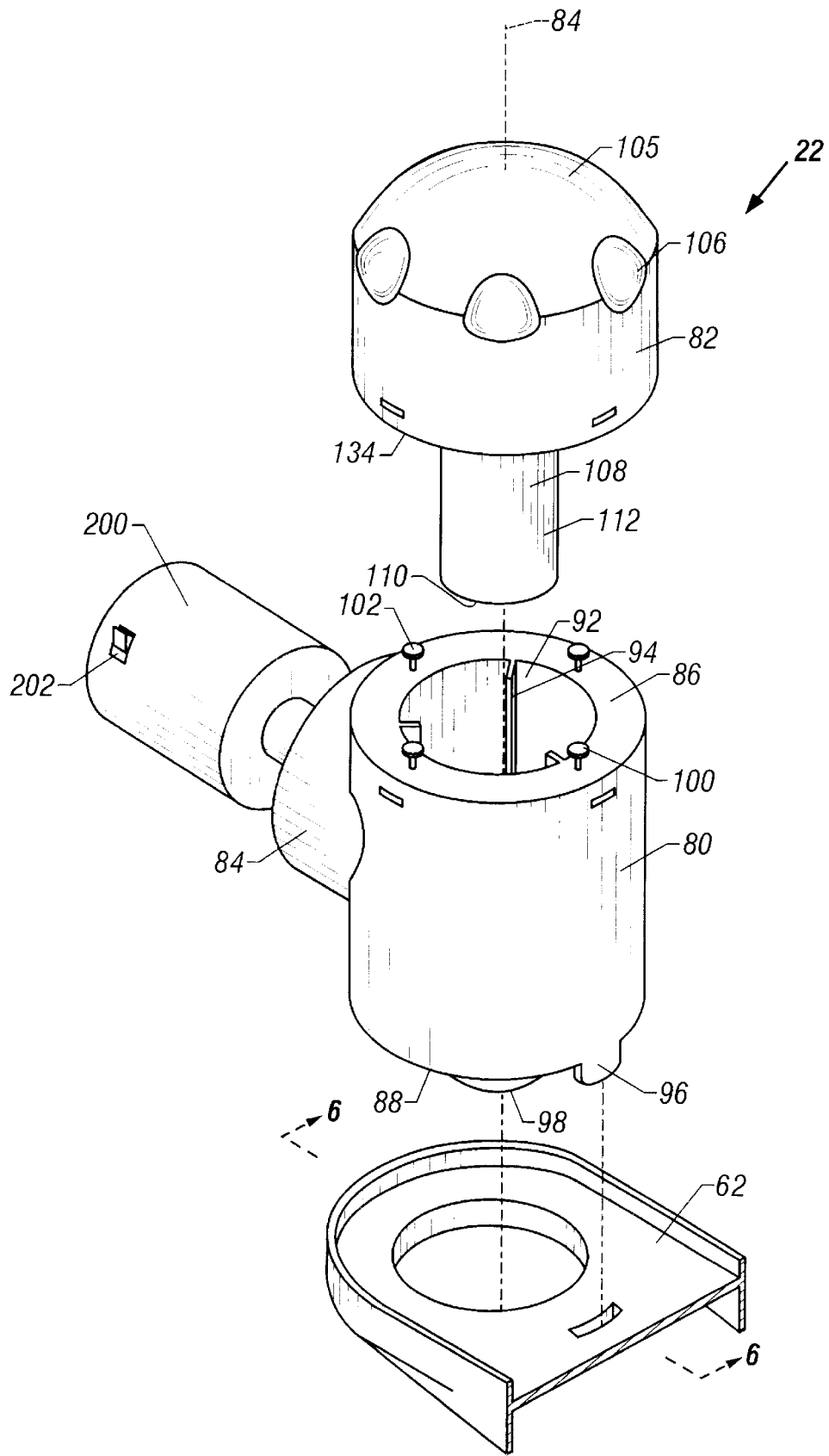
FIG. 10 is an exploded perspective view of an ice mill in accordance with an alternative exemplary embodiment of the present invention.

As illustrated in FIG. 10, in an alternative exemplary embodiment, a motor 200 including an on/off switch 202 can be connected to shaft 164 to provide the motive force to drive drive mechanism 85. In an exemplary embodiment, motor 200 is a dc operated motor.

In an exemplary embodiment, as shown in FIG. 6, drive assembly 85 provides an efficient, quiet method of manual operation. Drive assembly 85 is sized to allow users, even including children to operate ice mill 22 to create shaved ice. Alternatively, drive mechanisms 85 including belt drives and direct motor drives are contemplated.

Figure 9:
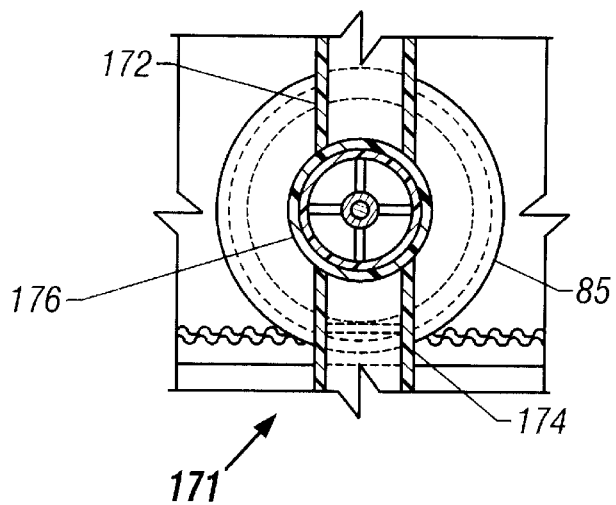
FIG. 9 is a side sectional view of the ice mill taken substantially along line 9—9 of FIG. 6.

Referring to FIG. 6 and FIG. 9, drive mechanism extension 171 includes upper and lower supports 172, 174 and a bearing 176. Upper and lower supports 172, 174 extend in a generally vertically direction and connect bearing 176 to drive mechanism extension 171. Bearing 176 is a generally cylindrical support integrally connected to upper and lower supports 172, 174. Bearing 176 is configured to rotatably support shaft 164 of drive mechanism 85. Upper and lower supports 172, 174 and bearings are made out of plastic. Alternatively, other materials such as metal, wood, etc. can be used.

Ice mill 22 provides an easy to operate apparatus with a "child-resistant" cover for the production of ice shavings for snow cones and the like. Cover 82 is adapted to reduce the likelihood of a small child opening and accessing chamber 92 of body 80. In an exemplary embodiment, cover 82 has an outer diameter of greater than approximately 3.5 inches and less than approximately 7.0 inches. Additionally, when solid volume of frozen beverage 90 is disposed within chamber 92 of ice mill 22, biasing member 114 of cover 82 bears down on solid volume 90 creating a force between cover 82 and solid volume 90. This force further increases the strength required or the force needed by the user in order to open cover 82 or ice mill 22 and thereby further restricts a child's ability to open ice mill 22 and access chamber 92. Additionally, blades 142 of blade assembly 132 are disposed at lower end 88 of body in a location that is positioned away from opening at upper end 86 of body 80 thereby significantly reducing the likelihood of a user contacting blades 142 within chamber 92. Moreover, in an exemplary embodiment, body 88 is configured to have an outer diameter of approximately 4 inches and an inner diameter of approximately 2 ½ inches thereby reducing and restricting the area of chamber 92 and further restricting a user from contacting blades 142 of ice mill 22.

In operation, a method of forming a non-rotatable solid, such as ice, for use in ice mill 22 includes the following. The user forms a non-rotatable, solid volume of frozen beverage 90, or other beverage, for use in ice mill 22 by placing a beverage into mold 122 and transferring mold 122 into a freezing unit, such as a conventional freezer. After the beverage has solidified, or frozen, the user removes mold 122 from the freezer and then removes solid volume of frozen beverage 90 from mold 122. The user then slidably inserts solid volume of frozen beverage 90 into chamber 92 of body 80 by aligning slots 103 formed in solid volume of frozen beverage 90 by ribs 124 of mold 122 with fins 94 of body 80. Once inserted into chamber 92, solid volume of frozen beverage 90 can move axially within body 80 along longitudinal axis 84 but is prevented from rotating within chamber 92 by the engagement of slots 103 of solid volume of frozen beverage 90 with fins 94.

A method of enclosing an ice chamber of ice mill 22 with a "child-resistant" cover includes the following. The user then encloses ice chamber 92 of body 80 with "child-resistant" cover 82 by grasping cover 82 at upper surface 105 and at indentations 106, positioning cover 82 over chamber 92 at upper end 86 of body 80, aligning rectangular portion 134 of channels 132 with fasteners 100 of body 80, inserting head 102 of fasteners 100 into rectangular portion 134, and rotating cover 82 relative to body 80 to position fasteners 100 within slot portion 136 of channels 132.

Once cover 82 is installed over chamber 92, housing 108 of cover 82 continuously presses down on solid volume of frozen beverage 90 causing solid volume of frozen beverage 90 to bear against lower plate 140 and blades 142. The user then places a suitable container under outlet 158 of funnel 98 for collecting ice shavings. The user then grasps and rotates hand crank 116. The rotation of hand crank 116 causes the rotation of lower plate 140. The rotation of lower plate 140 causes blades 142 to produce ice shavings from solid volume of frozen beverage 90. Ice shavings pass through one of openings 144, 146 and through funnel 98 to the container for use by the user.

While a preferred embodiment of the present invention has been described and illustrated, numerous departures therefrom can be contemplated by persons skilled in the art, for example, the cover can include downwardly projecting fasteners and the upper end of the body can include the channels for accomplishing the bayonet-type connection of the cover to the body. The cart can include any combination of accessories including, but not limited to, the cash register, the drink dispenser, the candy dispensers, the ice mill, and the containers. Therefore, the present invention is not limited to the foregoing description but only by the scope and spirit of the appended claims.

What is claimed is:

1. An apparatus for producing shavings of a solid volume of frozen beverage comprising:
    a hollow body defining a cavity having an axis and a substantially constant non-circular cross section perpendicular to the axis, the body having a first end and a second end, the non-circular cross-section is formed by disposing at least one radially inwardly protruding fin on a side wall of the cavity and is configured to engage the solid volume of frozen beverage and to prevent rotational movement of the solid volume of frozen beverage about the axis while allowing the axial movement of the solid volume of frozen beverage along the axis;
    a blade assembly rotatably mounted in the cavity near the second end of the body;
    a drive mechanism operably coupled to the blade assembly; and
    at least one mold, the mold having an open top, a closed bottom and at least one of longitudinally and inwardly extending molded rib adapted to correspond to the at least one fin of the body, the mold having a substantially constant, non-circular cross-section and is configured to receive a liquid and to retain the liquid as the liquid is frozen to produce the solid volume of frozen beverage.

2. The apparatus of claim 1, wherein the non-circular cross-section of the body is formed by three fins angularly spaced apart from one another and extending radially from the sidewall of the cavity.

3. An apparatus for producing shavings of a solid volume of frozen beverage comprising:
    a hollow body defining a cavity having an axis and a substantially constant non-circular cross section perpendicular to the axis, the body having a first end and a second end, the non-circular cross-section configured to engage the solid volume of frozen beverage and to prevent rotational movement of the solid volume of frozen beverage about the axis while allowing the axial movement of the solid volume of frozen beverage along the axis;
    a blade assembly rotatably mounted in the cavity near the second end of the body;
    a drive mechanism operably coupled to the blade assembly; and
    at least one mold adapted for forming the solid volume of frozen beverage having a non-circular cross-section that substantially corresponds to the cross-section of the cavity, such that the solid volume, when placed within the cavity, mutually interferes with the body to prevent rotation of the solid volume about the axis.

4. The apparatus of claim 3, further comprising a cover removably connected to the first end, the cover including a biasing member configured to exert continuous pressure on the solid volume of frozen beverage in the direction of the second end.

5. The ice shaving apparatus of claim 4, wherein the biasing member includes a spring and a housing, the spring being attached at a first end to a connector mounted to the cover and at a second end to a contact surface of the housing, the contact surface configured to contact the solid volume of frozen beverage.

6. The ice shaving apparatus of claim 3, wherein the drive mechanism includes a gear assembly transmitting power from a prime mover.

7. The apparatus of claim 6, wherein the prime mover is selected from the group consisting of a motor and a hand crank.

8. The ice shaving apparatus of claim 6, wherein the gear assembly includes a pair of bevel gears.

9. The ice shaving apparatus of claim 3, further comprising a funnel having an inlet and an outlet, the inlet of the funnel connected to the lower end of the body and positioned below the blade assembly, the funnel configured to catch and direct ice chips cut from the volume of frozen beverage by the blade assembly to the outlet of the funnel.

10. An ice mill for shaving a non-rotatable solid volume of frozen beverage or other frozen beverage, the ice mill comprising:
    a generally tubular body having an upper end and a lower end;
    a generally circular bottom plate rotatably coupled to the lower end of the body, the bottom plate having at least one opening;
    at least one blade connected to an generally upwardly extending from the bottom plate, the blade positioned adjacent to the opening;
    a drive mechanism coupled to the bottom plate; and
    a cover removably connected to the upper end, the cover including an inwardly and downwardly extending biasing member configured to exert continuous pressure on the solid volume of frozen beverage, wherein the biasing member has opposed first and second ends, the first end of the biasing member attached to the cover and the second end of the biasing member attached to an ice engaging plate, wherein the plate is formed to a housing which substantially encloses the biasing member, the housing configured to extend from and retract into the cover in response to the expansion and retraction of the biasing member, and to contract the solid volume of frozen beverage.

11. The ice mill of claim 10, wherein the cover is circular and has a generally convex upper surface, the upper surface having at least two notches configured to facilitate gripping of the cover, and the cover has an outer diameter between 3.5 inches and 7.0 inches such that a child cannot grip and manipulate the cover with one hand.

12. The ice mill of claim 10, wherein the circular bottom plate includes a first bevel gear attached to an edge of the bottom plate.

13. The ice mill of claim 12, wherein the drive mechanism includes a hand crank connected to a second bevel gear, the second bevel gear engaged with the first bevel gear.

14. The ice mill of claim 12, wherein the drive mechanism includes a motor connected to a second bevel gear, the second bevel gear engaged with the first bevel gear.

15. The ice mill of claim 10, further comprising a funnel having an inlet and an outlet, the inlet of the funnel connected to the lower end of the body and positioned below the bottom plate, the funnel configured to catch and direct ice chips cut from the volume of frozen beverage by the blade to the outlet of the funnel.

16. An ice mill for shaving a non-rotatable solid volume of frozen beverage or other frozen beverage, the ice mill comprising:
- a generally tubular body having an upper end and a lower end, wherein the body defines a cavity having an axis and a substantially constant non-circular cross-section perpendicular to the axis;
- a generally circular bottom plate rotatably coupled to the lower end of the body, the bottom plate having at least one opening;
- at least one blade connected to an generally upwardly extending from the bottom plate, the blade positioned adjacent to the opening;
- a drive mechanism coupled to the bottom plate;
- a cover removably connected to the upper end, the cover including an inwardly and downwardly extending biasing member configured to exert continuous pressure on the solid volume of frozen beverage; and
- at least one mold adapted for forming the solid volume of frozen beverage having a non-circular cross-section that substantially corresponds to a cross-section of the cavity defined within the body, the solid volume, when placed within the cavity, mutually interfering with the body to prevent rotation of the solid volume about the axis.

17. An ice shaving system for shaving a solid volume of frozen beverage, the system, the system comprising:
- an ice mill including a body having a first end and a second end, the body defines a cavity having a substantially constant, non-circular cross-section extending between the first ad second ends of the body;
- a blade assembly rotatably mounted in the cavity near the second end of the body;
- means for biasing the solid volume of frozen beverage against the blade assembly; and
- a spring loaded cover releasably connected to the first end of the body, the spring loaded cover bears against the solid volume of ice disposed within the cavity creating a force between the cover and the solid volume of frozen beverage, the cover being sufficiently sized such that the combination of the size and the force acting on the cover inhibits a child from removing the cover from the body.

18. The system of claim 17, wherein the means for biasing the solid volume of frozen beverage against the blade assembly includes gravity.

19. The system of claim 17, wherein the means for biasing the solid volume of frozen beverage against the blade assembly includes a spring loaded pusher.

\* \* \* \* \*